United States Patent
Feng (10) Patent No.: US 9,182,904 B2
(45) Date of Patent: Nov. 10, 2015

(54) CUES BASED ON LOCATION AND CONTEXT FOR TOUCH INTERFACE

(71) Applicant: Lenovo (Singapore) Pte. Ltd., Singapore (SG)

(72) Inventor: Xin Feng, Arcadia, CA (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 64 days.

(21) Appl. No.: 14/076,697

(22) Filed: Nov. 11, 2013

(65) Prior Publication Data

US 2015/0130771 A1   May 14, 2015

(51) Int. Cl.
- *G06F 3/041* (2006.01)
- *G06F 3/0488* (2013.01)
- *G06F 3/0484* (2013.01)

(52) U.S. Cl.
CPC ............ *G06F 3/0488* (2013.01); *G06F 3/0484* (2013.01); *G06F 2203/04108* (2013.01)

(58) Field of Classification Search
CPC .................. G06F 3/04–3/047; G06F 3/04812; G06F 3/04817; G06F 3/0482; G06F 3/04842; G06F 3/0487; G06F 3/0488; G06F 3/04886; G06F 2203/04108

USPC .......... 345/173–178; 178/18.01–18.09, 18.11
See application file for complete search history.

(56) References Cited

U.S. PATENT DOCUMENTS

| | | | | |
|---|---|---|---|---|
| 7,312,791 B2* | 12/2007 | Hoshino et al. | | 345/173 |
| 2002/0059217 A1* | 5/2002 | Oya et al. | | 707/4 |
| 2002/0196274 A1* | 12/2002 | Comfort et al. | | 345/741 |
| 2003/0197687 A1* | 10/2003 | Shetter | | 345/173 |
| 2009/0049398 A1* | 2/2009 | Ahn | | 715/780 |
| 2009/0140978 A1* | 6/2009 | Louch | | 345/157 |
| 2010/0020034 A1* | 1/2010 | Kim | | 345/173 |
| 2011/0022307 A1* | 1/2011 | Lee | | 701/202 |
| 2012/0105331 A1* | 5/2012 | Nomoto | | 345/169 |
| 2013/0097550 A1* | 4/2013 | Grossman et al. | | 715/779 |
| 2013/0106773 A1* | 5/2013 | Tokutake | | 345/174 |
| 2013/0241827 A1* | 9/2013 | Ronkainen | | 345/157 |

* cited by examiner

*Primary Examiner* — Stephen Sherman
(74) *Attorney, Agent, or Firm* — Ference & Associates LLC (57) ABSTRACT

An embodiment provides a method, comprising: detecting an object positioned relative to a touch surface of an information handling device; determining a position on the touch surface at which the object is located; associating the position on the touch screen with a cue type; and providing a cue of the cue type associated with the position, the cue indicating the determined position of the touch surface. Other aspects are described and claimed.

17 Claims, 5 Drawing Sheets

CUES BASED ON LOCATION AND CONTEXT FOR TOUCH INTERFACE

BACKGROUND

Information handling devices ("devices"), for example laptop computers, tablets, smart phones, e-readers, etc., may be used to accept user inputs in various formats. Among the formats of user inputs currently utilized are "touch" inputs, although this category of inputs includes inputs where physically touching a surface may not be required.

A user input component accepts the touch inputs. Examples of input components include touch sensitive surfaces, such as a touch screen (for direct input) or a digitizer or touch pad (for indirect or separate input from a display). The touch inputs may be provided using various objects, e.g., a writing implement such as a pen or stylus or even finger input. As noted, various user input components require that the object actually touch the input component, while other user input components may not require actual contact and can detect "hovering" or proximately located objects, e.g., a finger or stylus located near a touch input surface. Various mechanisms in turn exist for so-called hovering detection, e.g., capacitive technologies, camera or optical based sensing technologies, etc.

BRIEF SUMMARY

In summary, one aspect provides a method, comprising: detecting an object positioned relative to a touch surface of an information handling device; determining a position on the touch surface at which the object is located; associating the position on the touch screen with a cue type; and providing a cue of the cue type associated with the position, the cue indicating the determined position of the touch surface.

Another aspect provides an information handling device, comprising: a touch surface; a display device; a processor; and a memory device storing instructions executable by the processor to: detect an object positioned relative to the touch surface; determine a position on the touch surface at which the object is located; associate the position on the touch screen with a cue type; and provide a cue of the cue type associated with the position, the cue indicating the determined position of the touch surface.

A further aspect provides a program product, comprising: a storage medium comprising computer readable program code, the computer readable program code comprising: computer readable program code configured to detect an object positioned relative to a touch surface of an information handling device; computer readable program code configured to determine a position on the touch surface at which the object is located; computer readable program code configured to associate the position on the touch screen with a cue type; and computer readable program code configured to provide a cue of the cue type associated with the position, the cue indicating the determined position of the touch surface.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3(A-C) illustrates examples of cues in a touch interface.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a user is working with a touch interface, particularly on an indirect touch interface such as touchpad or digitizer, it is often challenging for the user to identify where the object (e.g., a finger) will land and be recognized for input before actually providing actionable inputs to the touch interface. Meanwhile, the action is already triggered, e.g., when the user's finger touches the touch sensitive surface.

Additionally, on a touch input surface, there are often different sub-elements that may be logically associated with various functions, e.g., virtual buttons. Users face a similar problem when attempting to interface with such sub-elements or areas because there is no indication that a desired touch input will be executed prior to the actual execution thereof. This is again because it can be difficult for the users to precisely determine where on the touch input surface they are providing inputs. These problems are exacerbated by the reduction in size of many such touch interfaces.

Accordingly, an embodiment provides a cue to the user indicating an area where the object (e.g., finger, stylus tip, etc.) is located. The indication may take a variety of forms, e.g., visual, audible, etc. Thus, for example, an embodiment may provide a visual cue on a display such that the visual cue indicates user's finger predicted landing location. The cue may be provided at various times, for example before a user's finger touches a surface to provide actionable input(s) to the touch surface.

The illustrated example embodiments will be best understood by reference to the figures. The following description is intended only by way of example, and simply illustrates certain example embodiments.

Figure 1:
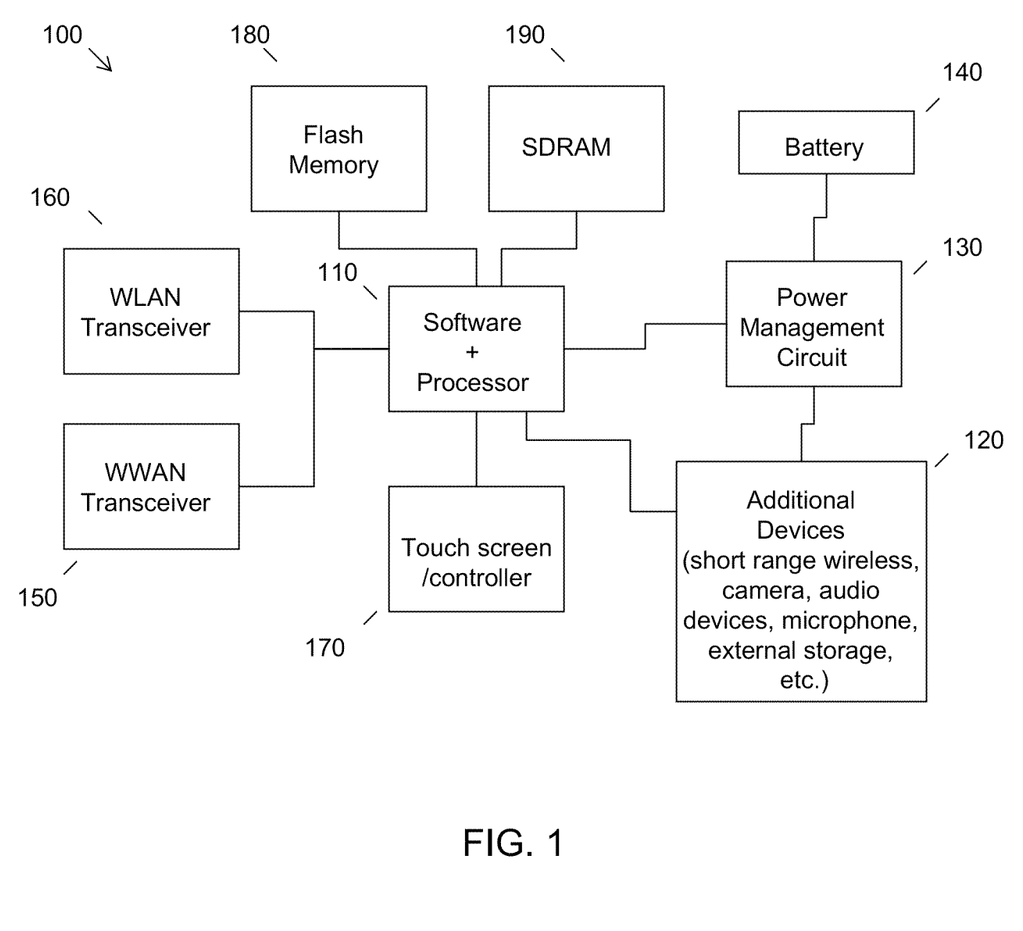
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a short range wireless communication device, such as a BLUETOOTH radio. Commonly, system 100 will include a touch screen 170 for data input and display, e.g., for accepting touch inputs. System 100 also typically includes various memory devices, for example flash memory 180 and SDRAM 190.

Figure 2:
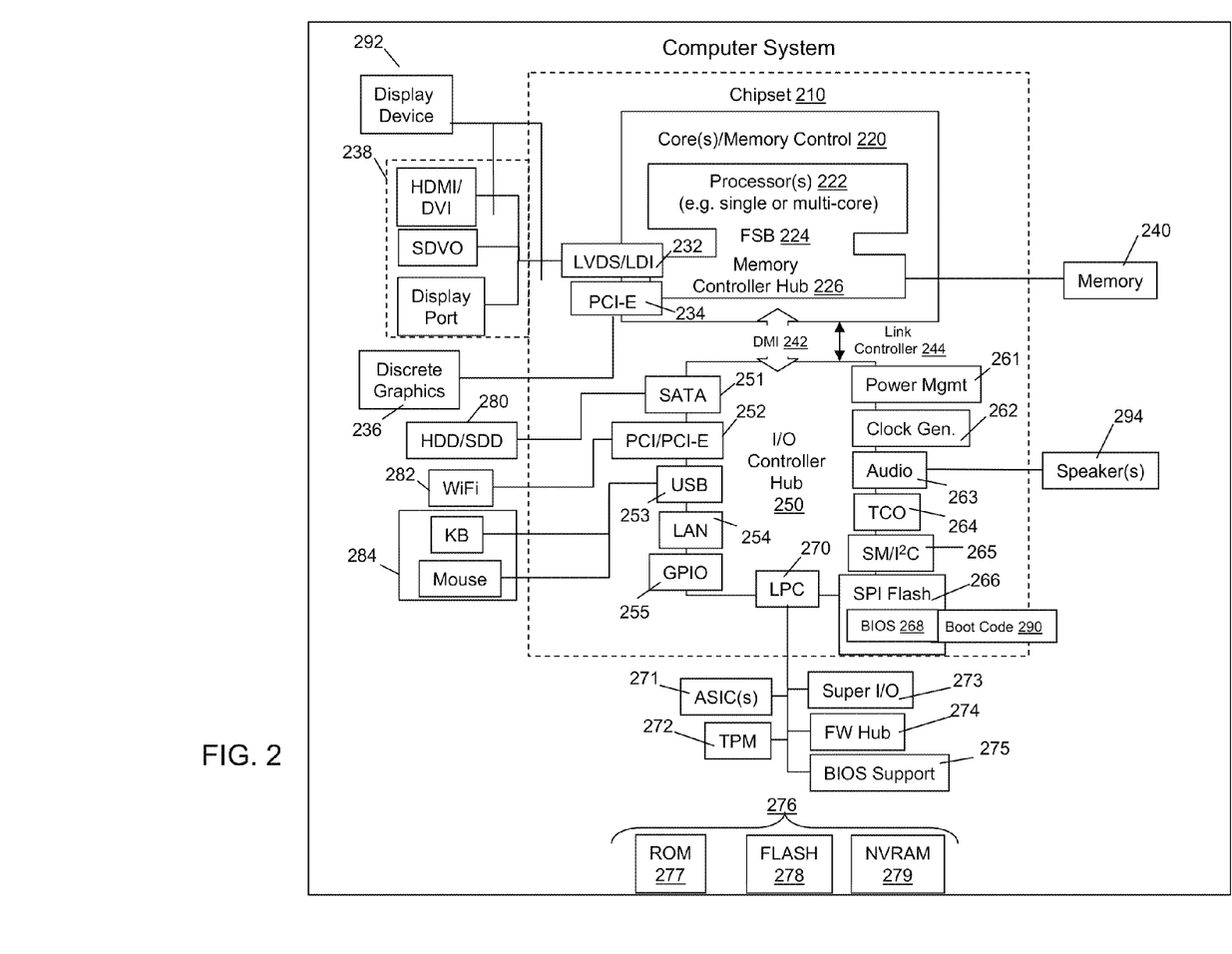
FIG. 2 illustrates another example of an information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may used in devices that provide touch surfaces to accept touch based inputs. Again, touch inputs may include inputs that require physical contact with a touch surface and/or inputs that do not require physical contact with the touch surface. Likewise, a touch surface may detect physical touching or contact as well as hovering or proximity of an object, such as an object hovering over the input surface. Moreover, the touch surface may be co-located with a display, e.g., as in a touch screen; or, the touch surface may be located in a different area of the device, e.g., as with touch pads and digitizers.

An embodiment provides a cue to the user regarding a predicted location of input on the touch surface. In the illustrated examples used herein, visual cues are described. However, embodiments may provide other cues and/or more than one cue. Visual cues are used in the illustrations for ease of discussion and visualization.

Figure 3A:
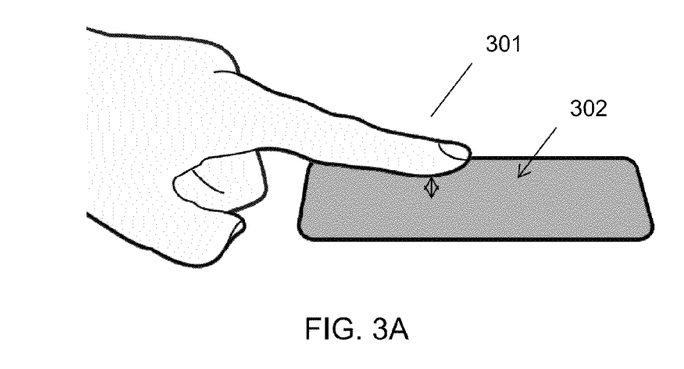

In FIG. 3A, an example object, e.g., a finger 301, is used to provide input to a touch surface 302. As described herein, the user need not touch the surface 302 with the finger 301, as the touch surface 302 may be able to detect an object 301 hovering above the surface, e.g., using capacitive sensing technology or like detection mechanisms (e.g., visual detection mechanisms using a camera or like sensor(s)). In an embodiment, the touch surface 302 may detect the object 301 hovering there-above and therefore determine a relative location of the object 301 with respect to the touch surface 302.

Figure 3B:
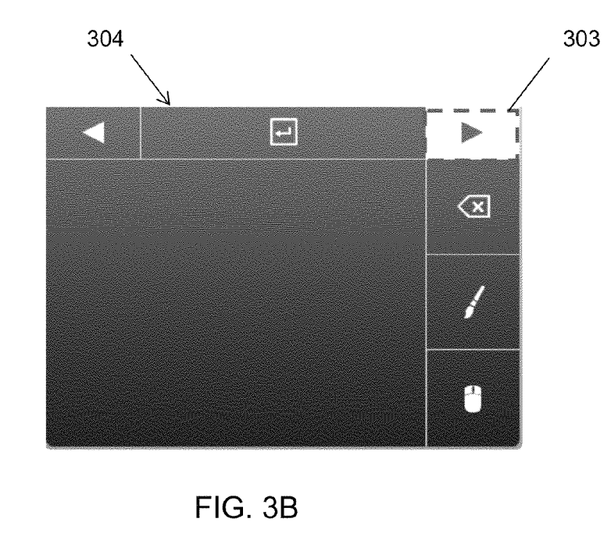
Figure 3C:
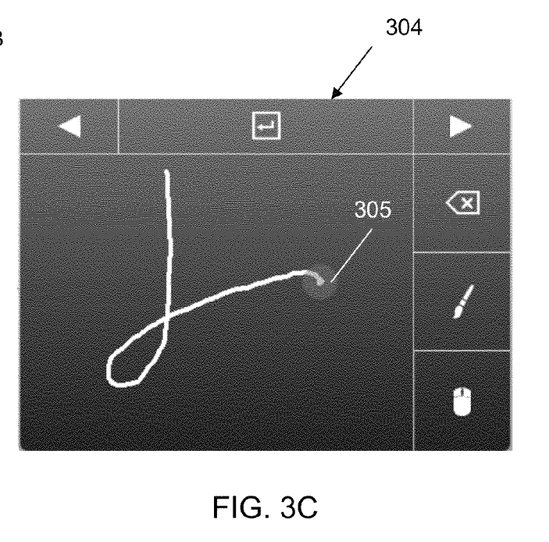

Given that the touch surface 302 is able to ascertain a relative location of the object 301, an embodiment provides a cue, e.g., as illustrated in FIG. 3B-C, to the user. In FIG. 3B, a visual cue 303 is provided in a sub-area of a visual rendering 304, for example as provided by a separate display screen or in the touch surface itself. The visual cue notifies or indicates to the user that, if the user proceeds with the input to the touch surface 302 with the current location of the object 301, the button associated with the visual cue 303 will be operated, i.e., an actionable input will be provided by the object 301 via the surface 302 to operate the functionality of the sub-area visually highlighted by the cue 303. Thus, the user will be apprised of the relative location of the object 301 with respect to the surface 302 prior to an actionable input being provided. This assists the user in repositioning the object 301, if necessary.

As will be appreciated, the visual cue 303 may be provided for the virtual button or sub-area when the object 301 is detected proximate to (e.g., hovering over) the surface 302 within the area enclosed by the visual cue 303. In the example of FIG. 3B, the visual cue 303 highlights a portion of the visual rendering 304 corresponding to the entire logical sub-area associated therewith. In other contexts, the cue provided may be different, as illustrated in the example of FIG. 3C.

FIG. 3C provides a different cue 305 as compared to the example of FIG. 3B. In the context of FIG. 3C, rather than sensing that an object 301 is hovering over a virtual button and therefore providing visual cue 303, an embodiment detects that the user is providing drawing input to a main input area of the surface 302. As such, an embodiment provides a different cue 305 in this context, illustrated in the form of a dot located at the point of current user input. Note that this cue 305 is of a different form (e.g., smaller), at a different location (located in nearly the exact position of input rather than a general highlighting of a logical sub-area) and provided at a different time (herein, while the user is touching the surface 302 with an object, e.g., 301, as compared with the cue 303. Accordingly, an embodiment may provide different cues 303, 305 given different input contexts encountered.

Thus, an embodiment may provide different cues depending on the context, e.g., area of touch surface over which the user is hovering. For example, a high fidelity visual cue may be used when a user's finger is over a handwriting area, e.g., displaying a cue in the form of a red dot or like visual cue. This cue is high fidelity because the cue is precisely indicating the finger's x-y position (or predicted position of contact). An embodiment may also provide a low fidelity visual cue, e.g., when a user's finger is hovering over a button area of the touch surface. Thus, an embodiment may highlight the whole button area as long as the finger is over any of the button area. Therefore, the cue is indicating over which button the finger is hovering. Accordingly, an embodiment may distinguish which type of cue to provide based on the associated area over which the object is detected (e.g., over which the object is hovering).

Figure 4:
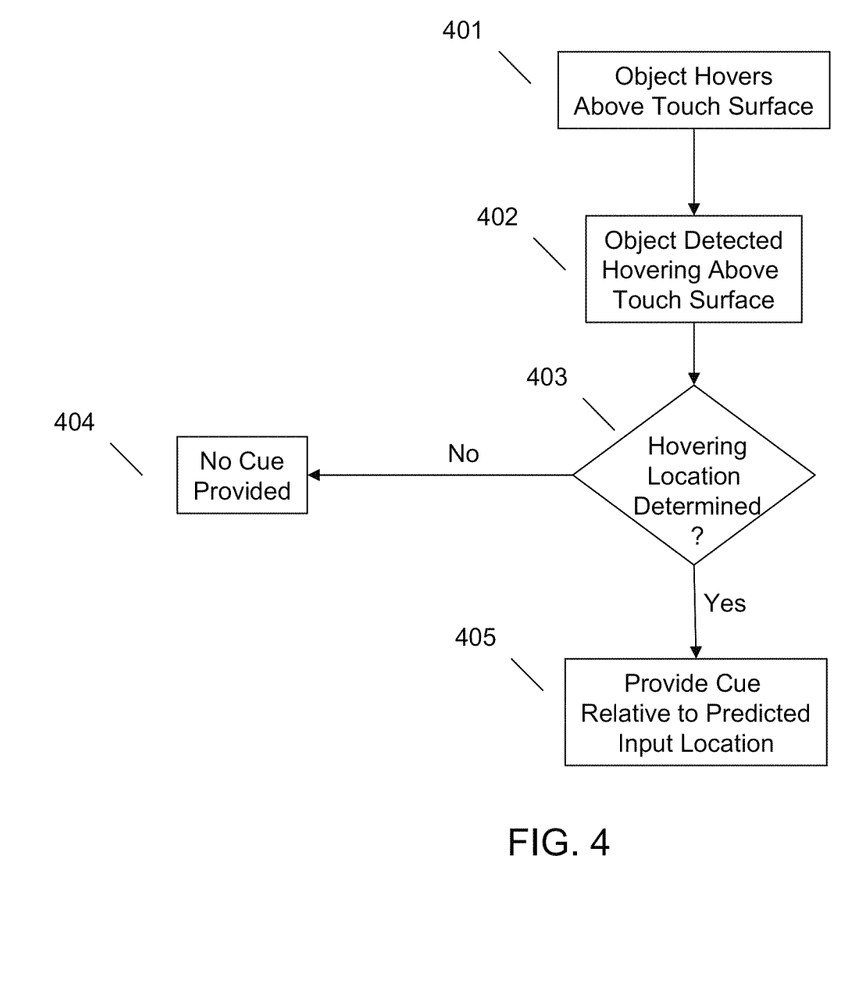
FIG. 4 illustrates an example method of providing cues in a touch interface.

Turning to FIG. 4, it may be appreciated that given a user hovering an object over a touch surface, e.g., touch pad, touch screen, digitizer, etc., at 401, an embodiment may detect the object is proximate to the touch surface at 402, e.g., a finger is placed near a certain portion of the touch surface. An embodiment may then determine the relative location of the object with respect to the touch surface at 403. For example, an embodiment may determine that the object is hovering over a virtual button or is hovering over another portion of the touch surface. If there is no determination of the hovering location, no cue may be provided at 404. Alternatively, an embodiment may provide a prompt to a user that the object should be moved closer to the touch surface. For example, for determining an object is hovering over a small portion of the touch surface, an object may have to be in closer proximity to the touch surface than for determining an object is hovering over a virtual button. The distance required may be dependent on the type of touch sensing technology employed.

If the hovering location can be determined at 403, an embodiment may provide a cue (e.g., a visual cue or other cue, such as an audible cue) indicating the relative, predicted position of the object with respect to the touch surface at 405.

As will be appreciated, in the context of a separate touch surface and display device, e.g., where the user is providing an indirect input, the cue may be translated to a location within the display. Thus, a user will be apprised that if input is provided at the current location on the touch surface, the corresponding input will be provided, as rendered in the display.

Alternatively, if the touch surface and the display are co-located, e.g., as in the case of a touch screen display, the cue may be modified as appropriate. For example, a visual cue may be offset but nonetheless provide visual information in a format that provides the user with information regarding which type of input will be provided should the object provide actionable touch input. This offset may be required to provide a visual cue in this context because of the obscuring quality of the object hovering over the screen. Likewise, an embodiment may implement or provide a different cue format, e.g., audible, if the object is obscuring the view of the underlying display.

Figure 5:
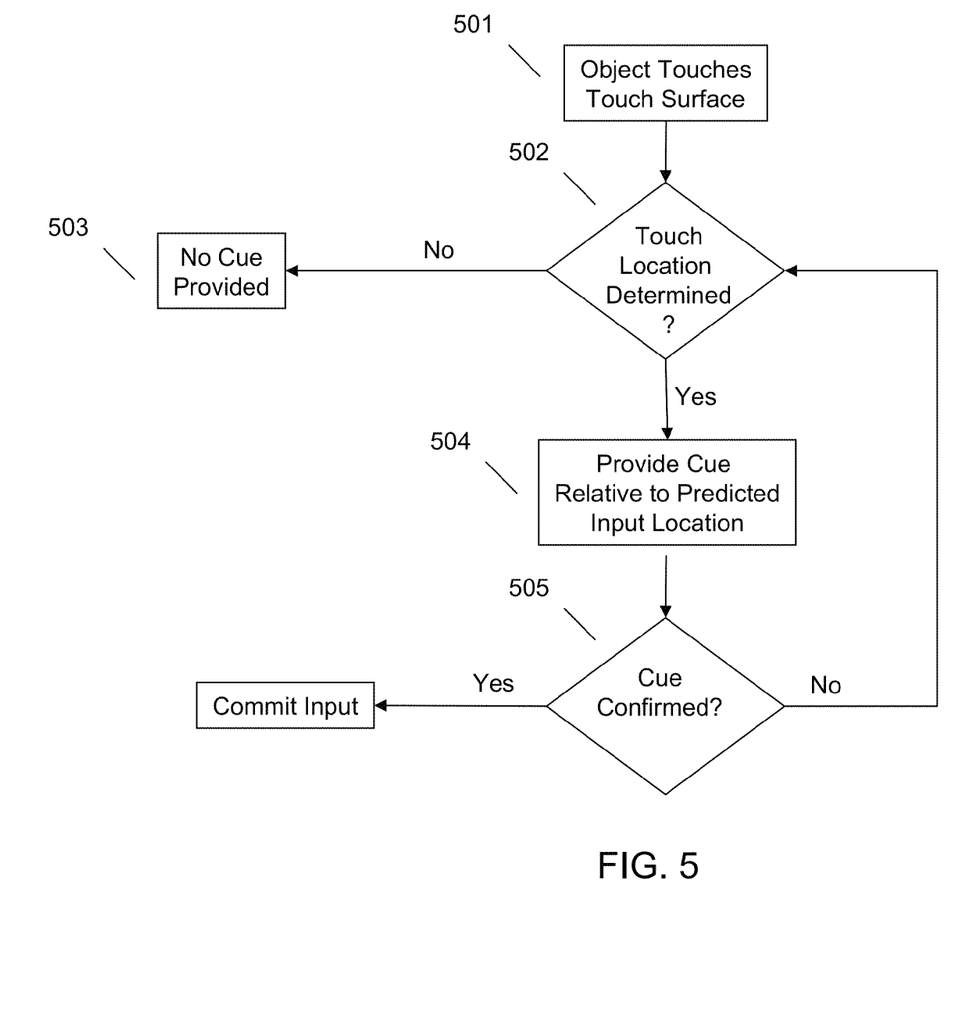
FIG. 5 illustrates another example method of providing cues in a touch interface.

In other contexts, an embodiment may provide a cue at a different time. For example, as illustrated in FIG. 5, an embodiment may determine that an object is touching the touch surface (or otherwise providing input thereto) at 501. If the location of the touch input can be determined at 502, an embodiment may provide a cue, e.g., visual cue rendered on a separate display, to apprise the user of the likely input location at 504. If the location cannot be determined for the object at 503, again no cue may be provided at 503 or another action may be taken (e.g., prompting the user for further input).

If the cue is provided, the user is apprised of the current location at which he or she is touching or otherwise interfacing with the touch surface. Therefore, an embodiment provides an opportunity, using the cue to apprise the user of how the object's input is being interpreted, to confirm the input prior to having an action executed. Thus, an embodiment may determine if the input is confirmed by the user at 505. For example, an embodiment may require further, confirming input from the user (e.g., double tapping on a virtual button after a visual cue has been provided highlighting the virtual button touched by a user) prior to taking the input to be actionable, e.g., to execute a function of an underlying application (e.g., navigating in a browser).

As will be appreciated, the various embodiments described herein provide cue(s) to users in various formats, where the type or timing of the cue may be dependent on the context encountered. By providing such cues, users of touch surfaces will be apprised of predicted or ascertained touch locations. Given this information, user will have an easier time confirming that the touch inputs provided are being appropriately interpreted by the underlying applications.

As will be understood by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting an object positioned relative to a touch surface of an information handling device;
   determining a position on the touch surface at which the object is located;
   associating the position on the touch surface with a cue type, the cue type being selected from among a plurality of cue types associated with different positions of the touch surface, wherein the plurality of cue types comprise a high fidelity cue and a low fidelity cue; and
   providing, on a display device, a visual cue of the selected cue type associated with the position, the visual cue comprising an indicator indicating the determined position at which the object is located relative to the touch surface.

2. The method of claim 1, wherein the low fidelity cue is associated with a virtual button.

3. The method of claim 1, wherein the detecting comprises detecting an object hovering over the touch surface.

4. The method of claim 1, wherein the low fidelity cue indicates a functional sub-area associated with the determined position of the touch surface.

5. The method of claim 1, wherein the high fidelity cue indicates a larger area than an input area associated with the predetermined position of the touch surface.

6. The method of claim 1, wherein the touch surface and a display are co-located.

7. The method of claim 1, wherein the touch surface and a display are provided in separate areas of the information handling device.

8. The method of claim 1, wherein the visual cue comprises a cue of a first cue type;
   the method further comprising:
   detecting an object positioned relative to another position on the touch surface;
   associating the another position on the touch surface with a second cue type; and
   providing a cue of the second cue type.

9. An information handling device, comprising:
   a touch surface;
   a display device;
   a processor; and
   a memory device storing instructions executable by the processor to:
   detect an object positioned relative to the touch surface;
   determine a position on the touch surface at which the object is located;
   associate the position on the touch surface with a cue type, the cue type being selected from among a plurality of cue types associated with different positions of the touch surface, wherein the plurality of cue types comprise a high fidelity cue and a low fidelity cue; and
   provide, on the display device, a visual cue of the selected cue type associated with the position, the visual cue comprising an indicator indicating the determined position at which the object is located relative to the touch surface.

10. The information handling device of claim 9, wherein the low fidelity cue is associated with a virtual button.

11. The information handling device of claim 9, wherein to detect comprises detecting an object hovering over the touch surface.

12. The information handling device of claim 9, wherein the low fidelity cue indicates a functional sub-area associated with the determined position of the touch surface.

13. The information handling device of claim 9, wherein the high fidelity cue indicates a larger area than an input area associated with the predetermined position of the touch surface.

14. The information handling device of claim 9, wherein the touch surface and the display device are co-located.

15. The information handling device of claim 9, wherein the touch surface and the display device are provided in separate areas of the information handling device.

16. The information handling device of claim 9, wherein the visual cue comprises a cue of a first cue type;
- the instructions being further executable by the processor to:
- detect an object positioned relative to another position on the touch surface;
- associate the another position on the touch surface with a second cue type; and
- provide a cue of the second cue type.

17. A program product, comprising:
- a storage medium comprising computer readable program code, the computer readable program code comprising:
- computer readable program code that detects an object positioned relative to a touch surface of an information handling device;
- computer readable program code that determines a position on the touch surface at which the object is located;
- computer readable program code that associates the position on the touch surface with a cue type, the cue type being selected from among a plurality of cue types associated with different positions of the touch surface, wherein the plurality of cue types comprise a high fidelity cue and a low fidelity cue; and
- computer readable program code that provides, on the display device, a visual cue of the selected cue type associated with the position, the visual cue comprising an indicator indicating the determined position at which the object is located relative to the touch surface.

* * * * *